(12) United States Patent
Bassett et al.

(10) Patent No.: US 7,886,887 B2
(45) Date of Patent: Feb. 15, 2011

(54) NOISE CONTROL USING TORSIONALLY RIGID DAMPER STAGE

(75) Inventors: Michael L. Bassett, Auburn, IN (US); Christopher D. Cole, Ft. Wayne, IN (US); Clinton J. McClellan, Butler, IN (US); Kevin Schlosser, Auburn, IN (US); Douglas G. Woolcott, Trenton, MI (US)

(73) Assignee: Eaton Corporation, Cleveland, OH (US)

( * ) Notice: Subject to any disclaimer, the term of this patent is extended or adjusted under 35 U.S.C. 154(b) by 446 days.

(21) Appl. No.: 11/347,042

(22) Filed: Feb. 3, 2006

(65) Prior Publication Data

US 2007/0181398 A1     Aug. 9, 2007

(51) Int. Cl.
    *F16D 43/08* (2006.01)
    *F16F 15/123* (2006.01)

(52) U.S. Cl. .................... 192/105 CP; 192/70.17; 192/213

(58) Field of Classification Search .............. 192/70.17, 192/105 CP, 213
    See application file for complete search history.

(56) References Cited

U.S. PATENT DOCUMENTS

| | | | |
|---|---|---|---|
| 2,028,951 A * | 1/1936 | Reed ...................... | 192/213 |
| 4,177,888 A | 12/1979 | Arrowsmith | |
| 4,412,606 A * | 11/1983 | Loizeau ..................... | 192/201 |
| 4,588,062 A * | 5/1986 | Caray et al. .............. | 192/214.1 |
| 4,596,324 A | 6/1986 | Braun | |
| 4,606,451 A | 8/1986 | Martinez-Corral et al. | |
| 5,450,935 A * | 9/1995 | Rumignani et al. .... | 192/213.22 |
| 6,443,284 B1 * | 9/2002 | Stretch .................... | 192/70.17 |
| 6,484,860 B1 | 11/2002 | Bassett | |
| 6,609,602 B2 * | 8/2003 | Gochenour et al. ..... | 192/105 C |
| 6,923,305 B2 | 8/2005 | Dulancy et al. | |

* cited by examiner

*Primary Examiner*—Richard M. Lorence
(74) *Attorney, Agent, or Firm*—Rader, Fishman & Grauer PLLC

(57) ABSTRACT

An embodiment provides a friction clutch apparatus that includes a disk assembly disk. The disk assembly has a disk portion selectively coupled to a first member, and a hub portion selectively coupled to a second member. The hub portion is generally axially aligned with the disk portion. The disk portion is rotatable relative to the hub portion. The disk assembly selectively transmits a torque between the first member and the second member. The disk assembly also includes an energy storage member selectively damping the relative rotation between the disk portion and the hub portion. The damping includes relative rotation between the disk portion and the hub portion. The energy storage member is preloaded, thereby requiring a preselected amount of torque to be applied by one of the disk portion and the hub portion to the other of the disk portion and the hub portion prior to the relative rotation.

23 Claims, 11 Drawing Sheets

NOISE CONTROL USING TORSIONALLY RIGID DAMPER STAGE

TECHNICAL FIELD

The technical field relates to clutches for a vehicular transmission, and more specifically to noise reduction during torque transmission.

BACKGROUND

Clutches are devices used to selectively connect a source of rotational power to a driven mechanism. For instance, in a vehicle drive-train system, a clutch is used to drivingly connect an engine to a transmission. When the engine is drivingly connected with the transmission by the clutch, vibrations are transmitted between the clutch and the transmission and other drive-train components, producing undesirable operating conditions, such as gear rattle or 'growl', which may produce an undesirable amount of noise and/or transmit vibrations through vehicle components to a user.

Centrifugally operated friction clutches typically include an input member driven by a prime mover, usually an electric motor or internal combustion engine. Further, such clutches also include weights rotatable with the input member which, upon rotation of the driving member, will move radially outwardly under the effect of centrifugal force to cause the input member to frictionally engage a driven output member.

Automatically actuated centrifugal clutches employed with heavy-duty electromechanical highway line-haul truck transmissions may include centrifugal actuation modules that house the centrifugally actuated weights. The centrifugal actuation modules are drivingly connected to an engine flywheel, and each of a plurality of centrifugally actuated weights may be adapted to swing in an arc about a pivot link fixed to a module housing structure. As such, the swing weights contained within the modules are radially outwardly movable against resistive spring forces as a function of engine speed—the higher the speed, the greater the outward movement between limits. Rollers attached to the weights selectively roll atop ramp segments that are cammed for clutch engagement and disengagement.

The driven output member typically includes a clutch hub engaged for rotation with a transmission input shaft and a clutch disk selectively engaged for rotation with the engine flywheel and a portion of the input member. To reduce the transmission of vibrations, the driven member typically employs a plurality of compression damping springs between the clutch hub and the clutch disc. These springs are typically disposed in spring pockets circumferentially located around the clutch hub. Compression of the damping springs is limited by stops disposed between the hub and the clutch disk, limiting the deflection of the damping springs and the relative rotation therebetween the hub and the clutch disk. Each of the damping springs may have a similar spring modulus and limit of deflection, or the springs may be grouped into multiple stages to provide differing levels of damping at differing values of transmitted torque. The damping springs provide some degree of isolation between the engine and transmission to reduce the transmission of vibration due to engine firing pulses and other engine speed fluctuations. However, vibrations can still be transmitted through the damping springs to produce gear rattle.

During clutch engagement and operation, excessive torsional excitation can generate noise even with damping springs incorporated into the driven member. It is believed that the damping springs contribute to this noise by allowing the teeth of the meshing gears within the transmission to impact on both the 'drive side' and the 'coast side' of the teeth. This 'double impacting' is thought to be caused as the torque applied through the driven member is within a range of values that permits a transmission of torque through the drive sides of the teeth, which deflects the damping springs almost instantaneously to eliminate the contact between the drive sides of the teeth as the 'driven gear' rotates momentarily at a greater speed than the 'driving gear'. When the contact between the drive sides of the teeth is eliminated, the coast sides of the teeth may impact, causing the driving gear to momentarily increase in speed such that the drive sides of the teeth then impact. In an undesirable operational state, the double impacting may be self propagating until factors such as torque applied, vehicle speed, or gear engagement, are changed.

When operating a drive train system without a centrifugal clutch, the operator may engage or disengage the clutch slightly to bring the drive train system out of an undesirable double impacting condition. In a drive train system with a centrifugally operated master clutch, the clutch engagement is typically controlled by engine speed, and an operator may not have a convenient opportunity to manually control the drive train system out of an undesirable condition, such as the double impacting condition or other conditions.

One solution to further reducing some of the transmission of vibrations has been to split the hub into an inner hub directly connected to the transmission input shaft and a coaxial outer hub connected to the clutch disc through the damping springs. The inner hub and outer hub may be configured to provide a predetermined amount of rotative lash therebetween. A predamper is placed between the inner hub and the outer hub. The predamper has springs selected to further damp out vibrations that can induce gear rattle or other undesirable operational conditions. Typically, the predamper will absorb about 10 ft·lb (13.5 N·m) before the compression of the predamper springs is limited by predamper stops.

However, the predamper is insufficient to reduce all undesirable noise and vibrations within the transmission during operation, especially during operational events that involve a high torque load. What is needed, therefore, is a method and/or apparatus to reduce noise and vibrations within a drive train system during predictable operational conditions.

SUMMARY

An illustrative embodiment provides a friction clutch apparatus that includes a disk assembly disk. The disk assembly has a disk portion selectively coupled to a first member, and a hub portion selectively coupled to a second member. The hub portion is generally axially aligned with the disk portion. The disk portion is rotatable relative to the hub portion. The disk assembly selectively transmits a torque between the first member and the second member. The disk assembly also includes an energy storage member selectively damping the relative rotation between the disk portion and the hub portion. The damping includes relative rotation between the disk portion and the hub portion. The energy storage member is preloaded, thereby requiring a preselected amount of torque to be applied by one of the disk portion and the hub portion to the other of the disk portion and the hub portion prior to the relative rotation.

Another illustrative embodiment provides a torque transfer system. The torque transfer system includes a transmission having torque transferring gears. The gears have meshing teeth selectively transmitting a torque therebetween. The torque transfer system also includes a centrifugally actuated clutch including a disk assembly. The disk assembly includes a disk portion selectively coupled to a first member, and a hub portion selectively coupled to a second member and generally axially aligned with the disk portion. The disk portion is rotatable relative to the hub portion. The disk assembly selectively transmits a torque between the first member and the second member.

In the illustrative embodiment, the disk assembly also includes an energy storage member selectively damping the relative rotation between the disk portion and the hub portion. The damping includes relative rotation between the disk portion and the hub portion. The energy storage member is preloaded, thereby requiring a preselected amount of torque to be applied by one of the disk portion and the hub portion to the other of the disk portion and the hub portion prior to the relative rotation.

An exemplary embodiment also provides a method of reducing vibrations in a drive train system. The method includes assembling a disk assembly with a disk portion and a hub portion. The disk portion is selectively coupled to a first member of the drive train, and the hub portion is selectively coupled to a second member of the valve train and generally axially aligned with the disk portion. The disk portion is rotatable relative to the hub portion, and the disk assembly selectively transmits a torque between the first member and the second member.

The method further includes preloading an energy storage member within the disk assembly to provide a preload between the disk portion and the hub portion. The energy storage member selectively dampens the relative rotation between the disk portion and the hub portion, the damping includes relative rotation between the disk portion and the hub portion, the energy storage member is preloaded, thereby requiring a preselected amount of torque to be applied by one of the disk portion and the hub portion to the other of the disk portion and the hub portion prior to the relative rotation.

BRIEF DESCRIPTION OF THE DRAWINGS

Referring now to the drawings, preferred illustrative embodiments are shown in detail. Although the drawings represent some embodiments, the drawings are not necessarily to scale and certain features may be exaggerated, removed, or partially sectioned to better illustrate and explain the present invention. Specifically.

FIG. 1 is a schematic illustration of a vehicular drive train system.

FIG. 4 is a schematic, partial sectional view of a centrifugal clutch.

DETAILED DESCRIPTION

Figure 1:
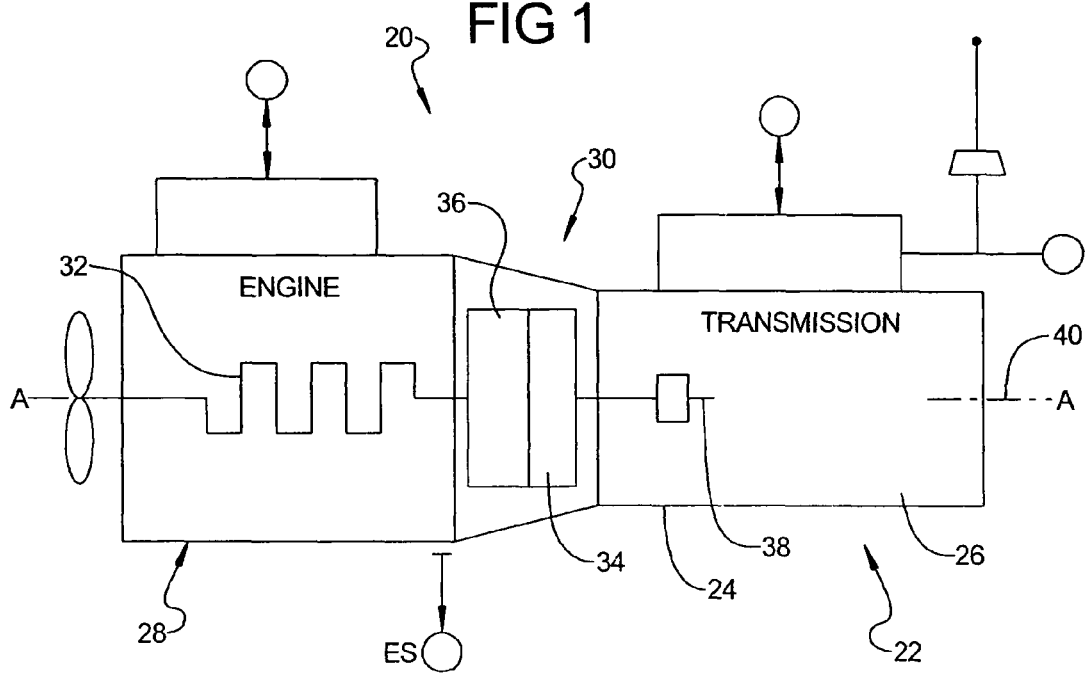
FIGS. 1 and 4 are schematic and are provided to illustrate relative interactions for discussion herein. Further, the embodiments set forth herein are not intended to be exhaustive or otherwise limit or restrict the claims to the precise forms and configurations shown in the drawings and disclosed in the following detailed description.

FIG. 1 schematically illustrates a torque transfer system, or vehicular drive train system, 20. By way of example, components within the system 20 may be fully automated, partially automated, or manual operated with controller assist.

The system 20 includes a change-gear transmission 22 having a main transmission section 24 connected in series with a splitter-type auxiliary transmission section 26. The transmission 22 is drivingly connected to a torque producing device, such as an internal combustion engine, 28, by a torque transmitting member, such as a centrifugal master friction clutch, 30. Transmission 22, by way of example, may be of the type well known in the prior art and sold by the assignee of this application, EATON CORPORATION, under the trademarks "Super-10" and "Lightning", and may be seen in greater detail by reference to U.S. Pat. Nos. 4,754,665; 5,370,013; 5,974,354; 5,974,906; and 6,015,366, the disclosures of which are incorporated herein by reference.

The engine 28 includes a crankshaft 32, which is attached to a driving member 34 of the clutch 30 that frictionally engages with, and disengages from, a driven member 36 attached to an input shaft 38 of the transmission 22. A transmission output shaft 40 extends from the auxiliary transmission section 26 for driving connection to the vehicular drive wheels (not shown), as through a drive axle (not shown) or transfer case (not shown).

The terms "engaged" and "disengaged" as used in connection with a master friction clutch refer to the capacity, or lack of capacity, respectively, of the clutch to transfer a significant amount of torque. Mere random contact of the friction surfaces, in the absence of at least a minimal clamping force, is not considered engagement.

As may be seen from a FIG. 1, the clutch 30 is centrifugally operated and requires no external clutch actuator, but is operated generally as a function of the rotational speed (ES) of engine 28. The clutch 30 also requires no connections to operating linkages, command signal inputs, power electronics and/or compressed air and/or hydraulic conduits. The most economical application of the illustrated embodiment is a dry clutch; however, other embodiments may include a wet clutch technology.

As discussed in greater detail below, rotation of the driving member 34 will cause clutch 30 to engage and drivingly connect the engine rotational output of the crankshaft 32 to transmission input shaft 38. The clamping force, and thus the torque transfer capacity of clutch 30 is a function of the rotational speed (ES) of engine 28 and the driving member 34. The clutch 30 should reach incipient engagement at an engine speed slightly greater than engine idle, and should fully engage at an engine speed lower than the engine speed at which a first upshift is required. Unlike typical spring applied master friction clutches, which are normally engaged, clutch 30 is disengaged at lower engine speeds.

To allow proper vehicle launch and dynamic shifting with the clutch 30 engaged, the clutch 30, once fully engaged, should remain fully engaged at engine speeds greater than (i) the highest expected speed at which downshifts are initiated and (ii) the minimum expected engine speed after an upshift. Incipient engagement of clutch 30 is the initial torque transfer contact of clutch friction surfaces may be seen by reference to U.S. Pat. Nos. 4,646,891 and 6,022,295, the disclosures of which are incorporated herein by reference.

Figure 4:
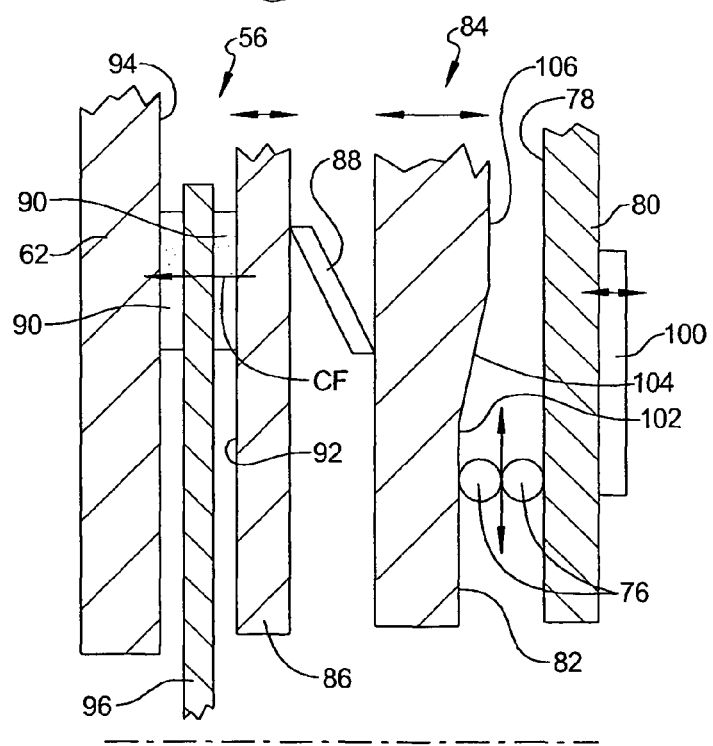
Figure 2:
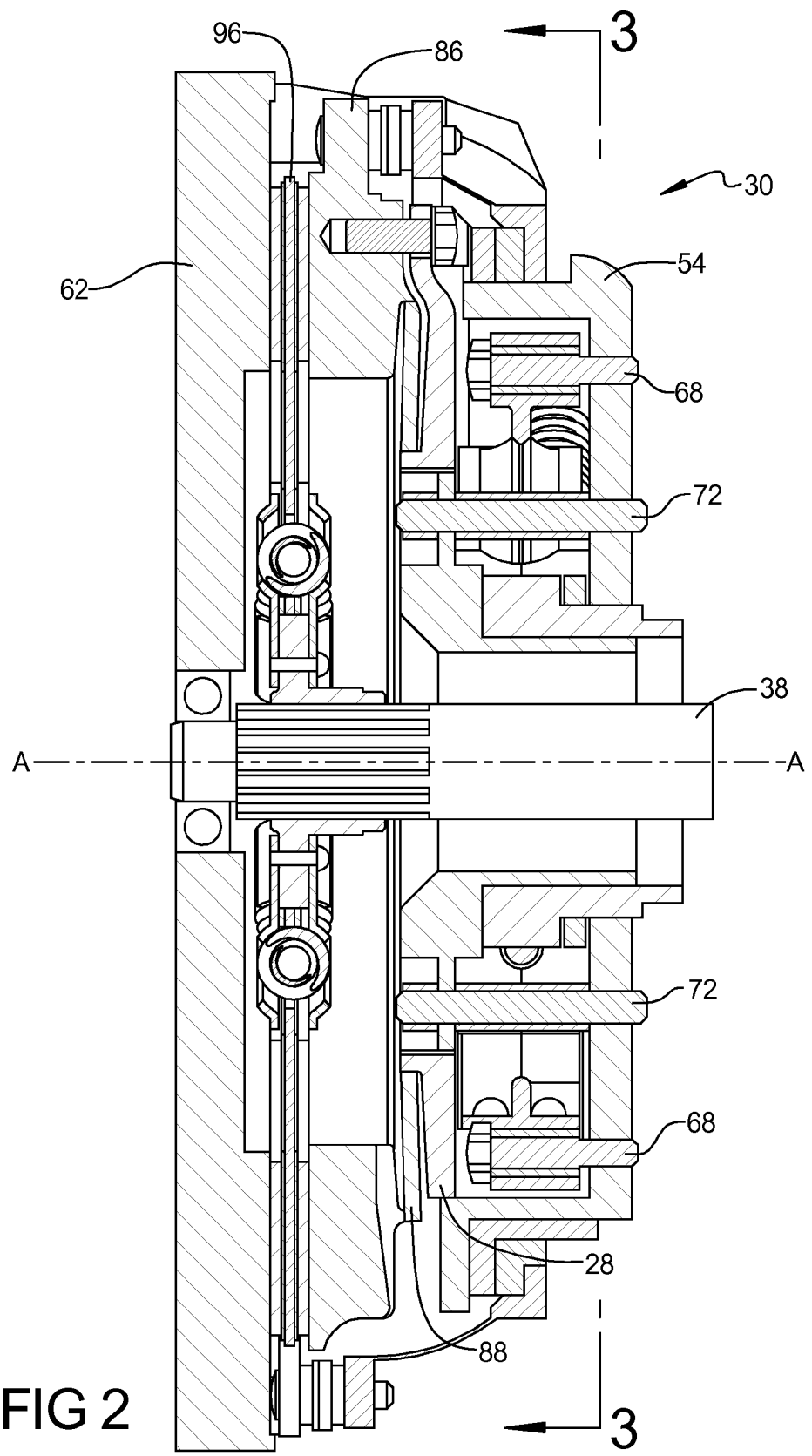
FIG. 2 is a partial sectional side view of a centrifugal clutch according to an embodiment.
Figure 3:
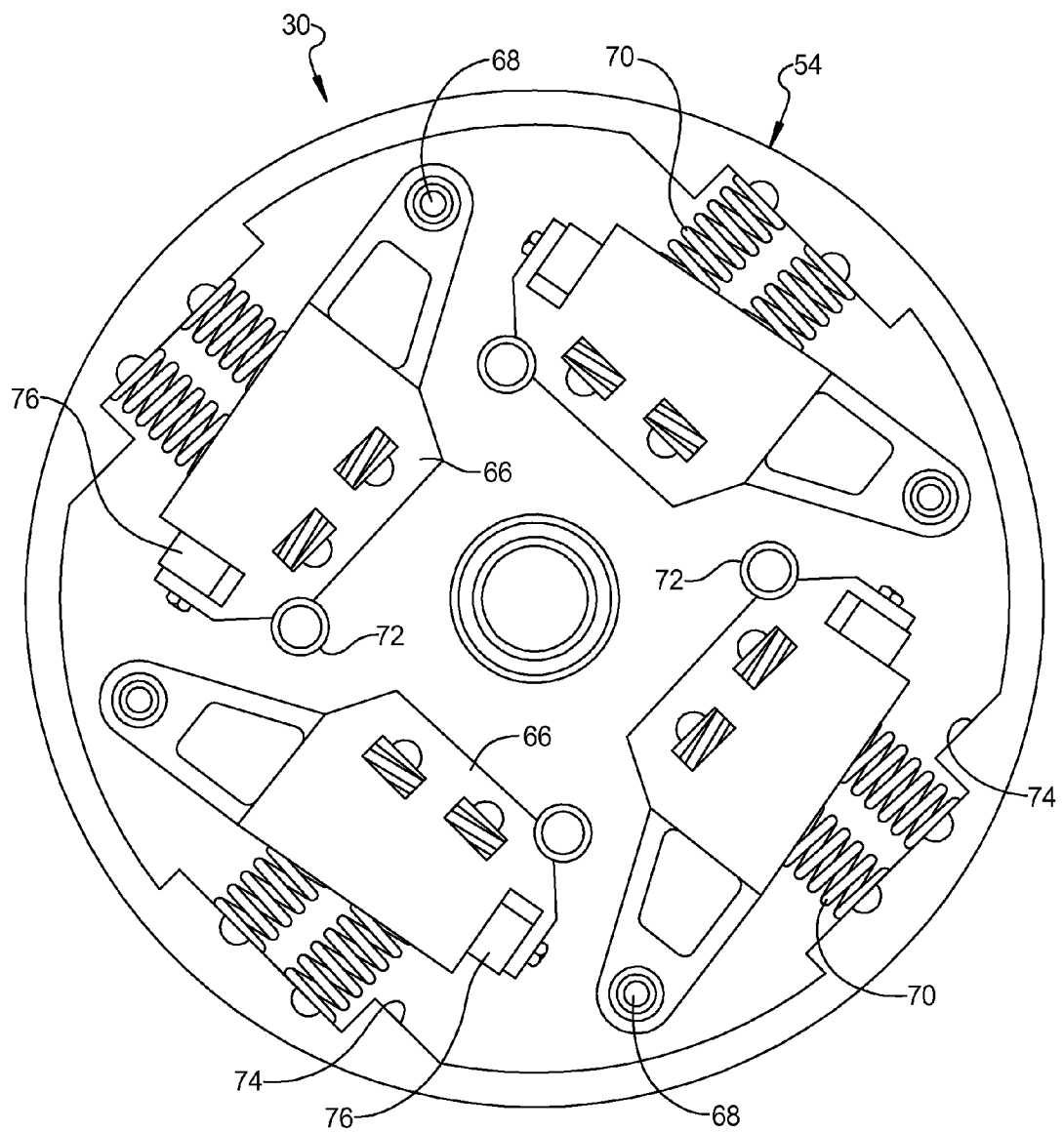
FIG. 3 is a partial end view, in section with section graphics omitted for clarity, taken generally along line 3-3 of FIG. 2.

To more fully describe an exemplary embodiment, reference is made to the clutch 30 shown in FIGS. 2-4. The clutch 30 includes a cover module 54 (FIG. 4) and a driven disk 56. The cover module 54 mounts to an engine flywheel 62 for rotation therewith and comprises the driving portion 34 of clutch 30. The driven disk 56 is typically splined to transmission input shaft 38 and comprises the driven portion 36 (FIG. 1) of clutch 30, as discussed in greater detail below.

As best seen in FIGS. 3 and 4, cover module 54 includes four swing weights 66, which are movably attached to cover module 54 at pivot pins 68. Return springs 70 bias swing weights 66 radially inwardly to rest on a first stop member 72. A second stop member 74 limits the radially outward movement of swing weights 66. As engine 28 and cover module 54 rotate, the effect of centrifugal force will cause swing weights 66 to move against the biasing force of springs 70 from a position abutting stop members 72 toward stop members 74. Swing weights 66 each carry one or more rollers 76, which act between a reaction surface and a ramp to provide an axial clamping force for engaging clutch 30.

As shown in FIGS. 3 and 4, rollers 76 are received between a substantially flat surface 78 of a fixed reaction plate 80 and a ramp surface 82 of an axially movable ramp plate 84. Ramp plate 84 acts on an axially movable main pressure plate 86 through a preloaded spring member 88, which limits the axial force applied to the main pressure plate 86 by ramp plate 84. The main pressure plate 86 applies a clamping force CF on a pair of friction members, or friction pads, 90, which are trapped between a main pressure plate surface 92 of the main pressure plate 86 and a flywheel surface 94 of the engine flywheel 62. The friction pads 90 are coupled to opposing sides of a disk plate 96. The disk plate 96, as discussed in greater detail below, is coupled to input shaft 38 for rotation therewith.

When the clutch 30 is engaged, the disk plate 96 rotates with the plates 80, 84, and 86 and the engine flywheel 62. Clutch 30 also includes an adjustment mechanism 100 for modifying the axial position of reaction plate 80 to accommodate wear in friction pads 90 and, accordingly, maintain a more consistent engagement point.

At rest, rollers 76 will engage a recessed portion 102 of ramp surface 82 and will not apply a leftward axial clamping force to friction pads 90. As rollers 76 travel sufficiently radially outwardly, and onto a ramped portion 104 of ramp surface 82, an increasing axial clamping force is applied. As rollers 76 move further radially outwardly onto a flat extended portion 106 of ramp surface 82, the clamping force will remain at a capped value as limited by preloaded spring member 88. The swing weights 66 will hit stops 74 prior to full compression of springs 70.

As wear occurs in friction pads 90, rollers 76 will be required to travel farther up the ramped portion 104 to apply a given clamp load during clutch engagement. This wear, and the corresponding increased outward movement in swing weights 66, causes the engagement point of clutch 30 to change due to the increased compression of biasing springs 70.

As the centrifugal force increases and overcomes the preload of spring member 88, swing weights 66 will move from ramped portion 104 onto the relatively flat extended portion 106 of the ramp surface 82. Once on flat extended portion 106, clutch 30 can transmit a given torque at a lower engine speed without the swing weights 66 traveling back down ramped portion 104.

Figure 5:
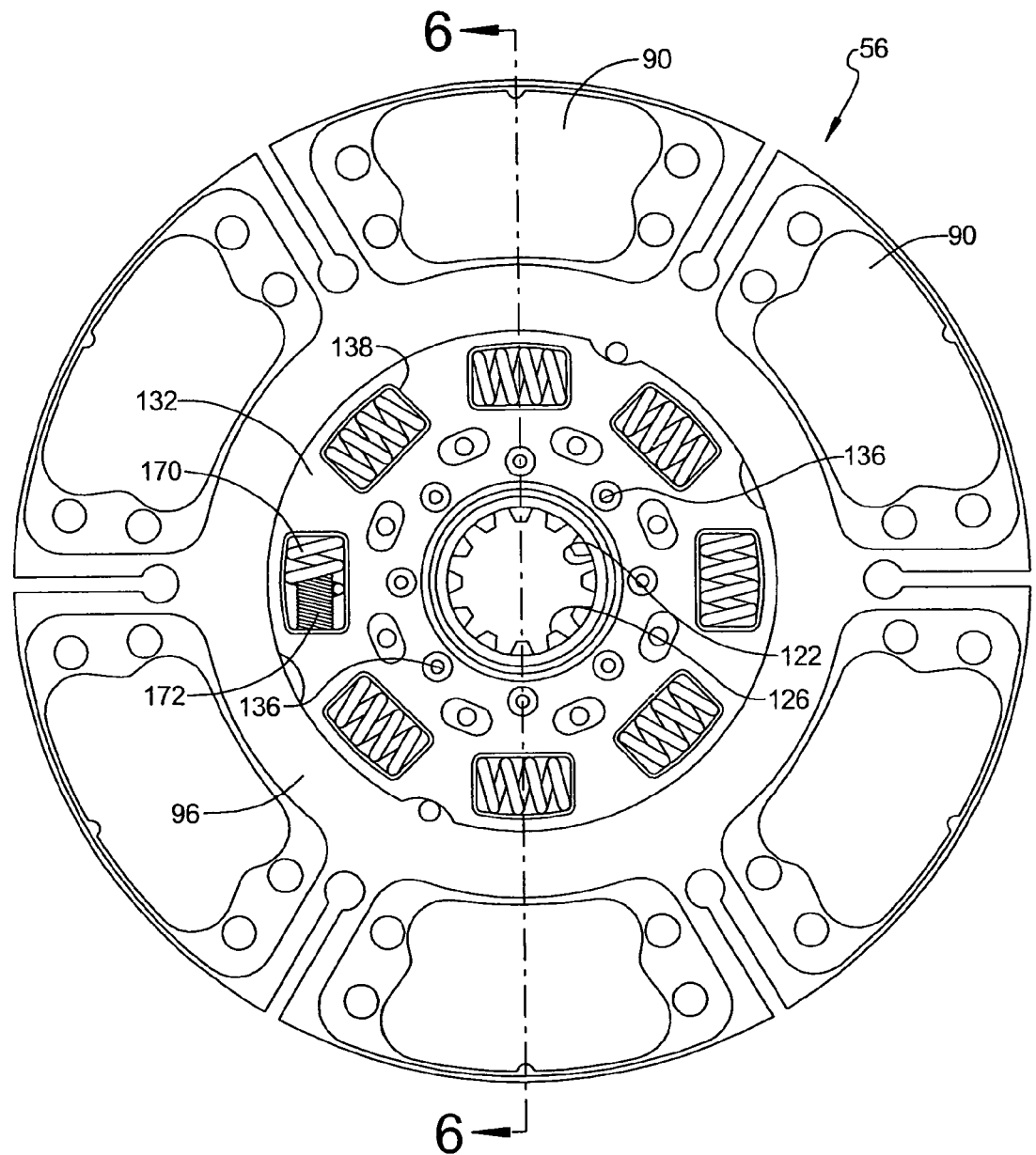
FIG. 5 is a front view of a driven disk according to an embodiment.
Figure 6:
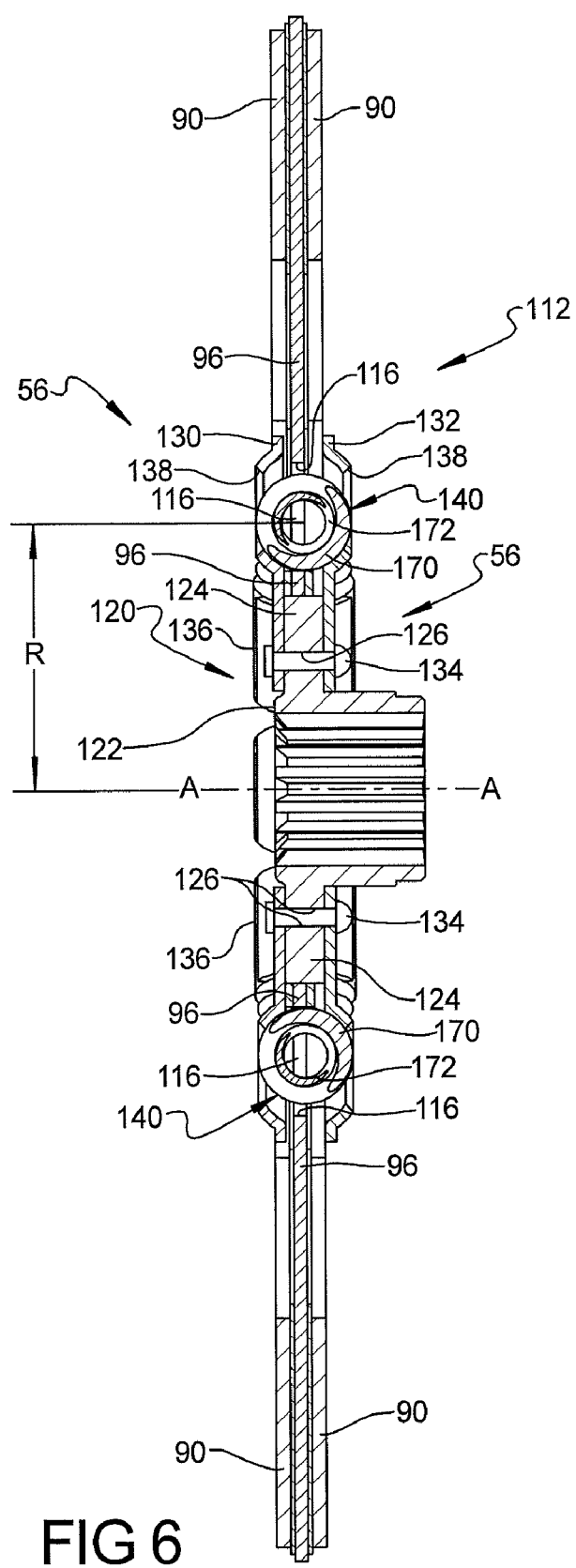
FIG. 6 is a side view of the driven disk of FIG. 5.

Referring now to FIGS. 5 and 6, a driven disk 56 according to an embodiment is shown. The driven disk 56 includes a rotatable disk assembly 112 having a disk plate 96 that includes a plurality of apertures 116. In the embodiment illustrated, twelve of the friction pads 90 are attached to the disk plate 96 for frictional engagement between the main pressure plate 86 and the flywheel 62. The driven disk 56 also includes a hub assembly 120 having an inner hub surface 122 defined, at least in part, by spines for slidable engagement with the transmission input shaft 38 (FIG. 4) a hub flange 124, and hub flange fastening apertures 126. The hub assembly 120 is secured to a first spring cover plate 130 and a second spring cover plate 132 by a plurality of fasteners 134, such as rivets, as discussed in greater detail below. Each of the driven disk 56, hub assembly 120 and disk assembly 112 are selectively rotatable generally about the axis A-A.

The first and second spring cover plates 130, 132 each include a plurality of cover plate fastening apertures 136 and a plurality of sockets 138 disposed therein, which are at least partially aligned with the apertures 116 in disk plate 96. The sockets 138 may include or may be at least partially defined by an aperture as shown the illustrated embodiment. An energy storage member 140 is disposed within each of the correspondingly aligned apertures 116 and sockets 138 within disk plate 96 and each of the first and second spring cover plates 130, 132, respectively. In the illustrated embodiment, the disk assembly 112 is rotatable relative to the hub assembly 120.

Figure 7:
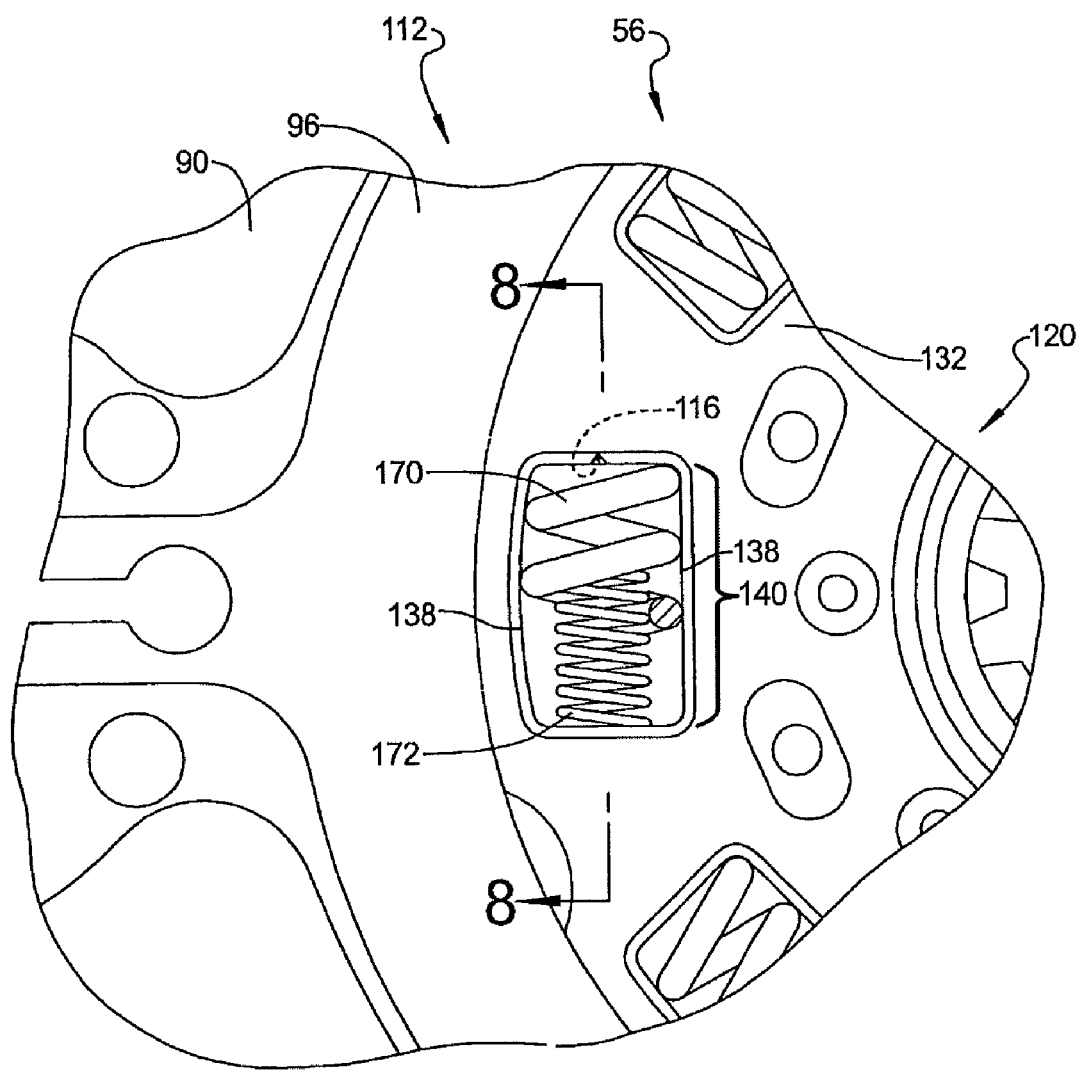
FIG. 7 is an enlarged view of portion 7 of FIG. 5.

The energy storage members 140 are disposed within sockets 138 and the apertures 116 for absorbing torque as a function of relative rotation between the hub assembly 120 and the disk assembly 112. In the embodiment illustrated in FIG. 7, one energy storage member 140 is illustrated as a plurality of coil springs, specifically an outer coil spring 170 and an inner coil spring 172, both illustrated partially for clarity. The springs 170, 172 are preferably co-axial with each spring axis (shown generally at cut-line 8-8 in FIG. 7) spaced from the axis A-A a distance R (FIG. 6).

The outer coil springs 170 are operatively disposed between the disk assembly 112 and the hub assembly 120. More specifically, the outer coil springs 170 and the inner coil springs 172 axially extend within the disk plate 96, contacting interior surfaces of the apertures 116 and further extend within the first spring cover plate 130 and the second spring cover plate 132, contacting interior surfaces of the sockets 138. As the disk assembly 112 rotates relative to the hub assembly 120, energy is absorbed by the outer coil springs 170 and the inner coil springs 172 as a function of axial displacement of the outer coil springs 170 and the inner coil springs 172, which is caused by the relative rotation between the disk assembly 112 and the hub assembly 120. Thus, the driven disk 56 of the exemplary embodiment dampens torsional vibrations in a driveline as a result of the relative rotation between the disk assembly 112 and the hub assembly 120. More specifically, as a torsional vibration is introduced to driven disk 56, the hub assembly 120 rotates with respect to the disk assembly 112, whereby torque spikes are dissipated as the coil springs 170, 172 store and release energy (compress and then expand).

Preferably, the outer coil springs 170 and/or the inner coil springs 172 are compressed in an installed configuration, thereby having a negative clearance within the apertures 116, 138 to provide a preload. The preloading may be provided to either or both of the outer coil springs 170 and the inner coil springs 172, as desired.

Torsional damping is achieved within the illustrated embodiment by providing an energy storage component (i.e., energy storage members 140). However, an optional hysteresis component may also be including in driven disk 56 to provide supplemental torsional damping. In an embodiment, an optional hysteresis, or frictional element (not shown), may be provided between the disk plate 96 and the second spring cover plate 132. The hysteresis may be a friction pack or other device that increases the surface-to-surface coefficient of friction between the disk plate 96 and second spring cover plate 132. A portion of the disk plate 96 may be axially offset relative to planar base portion 60 to accommodate the hysteresis. As the load along the axis of rotation A-A increases between the hub assembly 120 and the disk assembly 112, the resulting friction force is increased.

While the driven disk 56 is presented herein as including only one damper having multiple springs 170, 172 that may provide for more than one damper stage, the driven disk 56 may also incorporate a predamper stage for reducing vibrations during idle of engine 28 and/or neutral conditions of transmission 22, such as is presented in commonly owned U.S. Pat. No. 6,633,806 to Gochenour and U.S. Pat. No. 6,923,305 to Dulancy, et al., the disclosures of which is incorporated by reference. Such predamper stages typically absorb a relatively small amount of torque compared to the output of an associated engine, typically about 10 ft·lb (13.5 N·m), and do not affect the operation of a driven disk assembly, such as the driven disk 56, during operational events of concern in the present application. Incorporation of a predamper in the driven disk 56, such as between the hub assembly 120 and the first spring cover plate 130 and the second spring cover plate 132, may be accomplished if desired.

The inventors have discovered that preloading the outer coil springs 170 and/or the inner coil springs 172 reduces noise emanating from the transmission 22 during definable operating conditions. This preloading is preferably accomplished by inserting lengthened springs 170 and/or 172 into the driven disk 56 with a negative clearance, although preloading may be accomplished by modifying other components of the driven disk, or by inserting spacers adjacent the axial ends of the springs 170, 172.

To describe an embodiment of the assembly of the driven disk 56, specific reference is made to FIGS. 5 and 6. The inner coil springs 172 are interposed within the outer coil springs 170 to form the energy storage members 140. One of the energy storage members 140 is then inserted into each aperture 116 of the disk plate 96. The hub assembly 120 is then placed adjacent the disk plate 96 such that the hub flange 124 is in general radial alignment with the disk plate 96. The cover plates 130, 132 are then aligned on either side of the disk plate 96, such that the energy storage members 140 are generally aligned with the sockets 138, as best seen in FIGS. 5 and 6. One of the fasteners 134 is then inserted through each cover plate fastening aperture 136 of the cover plate 132, the hub flange fastening apertures 126, and each cover plate fastening aperture 136 of the cover plate 130, as best seen FIG. 6, and the fasteners 134 are secured to the outer surfaces of the cover plates 130, 132. As mentioned above, at least a portion of the springs 170, 172 are preloaded, or assembled with a negative clearance within the driven disk 56.

Figure 8:
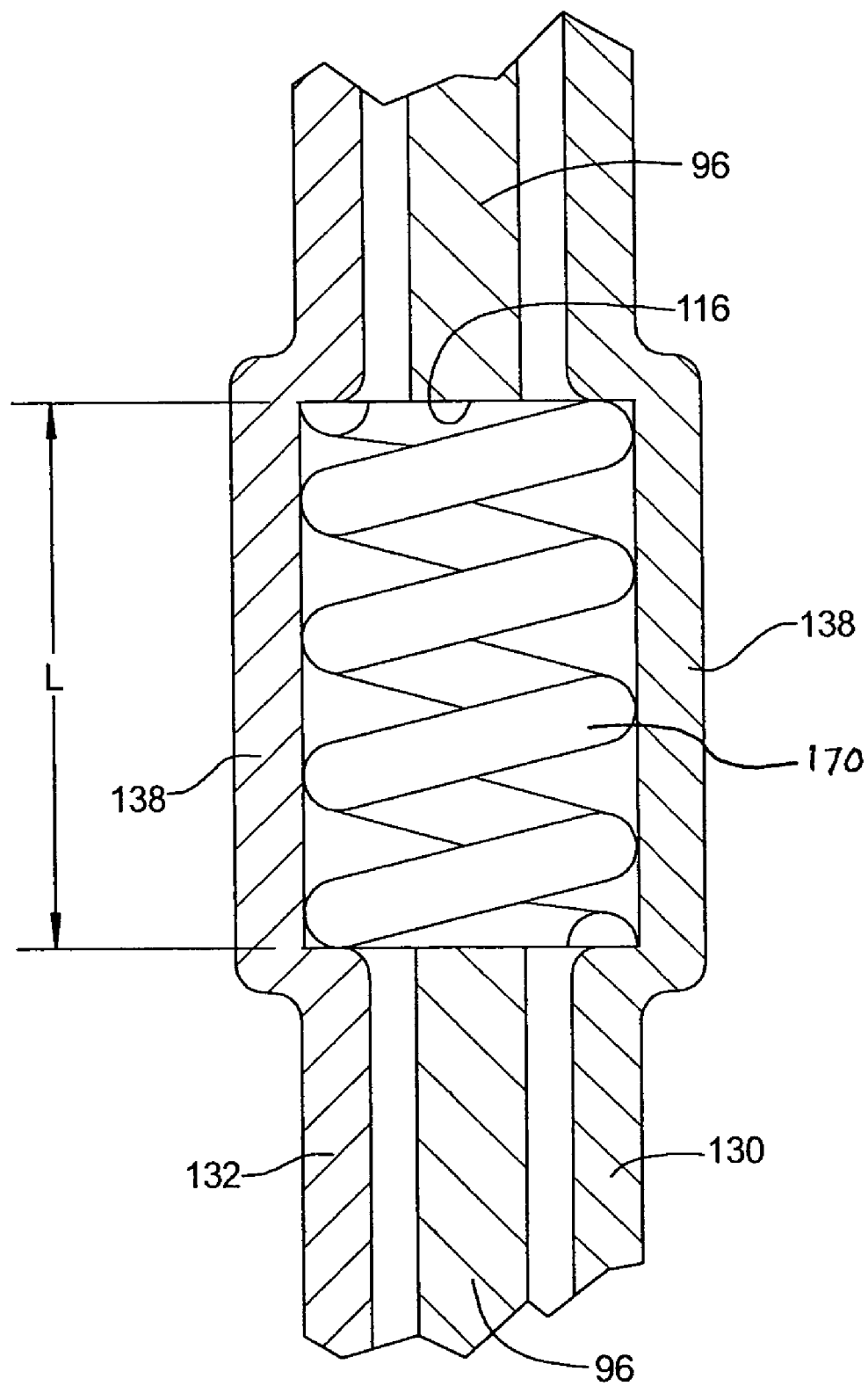
FIG. 8 is a partially sectioned view taken along line 8-8 of FIG. 7, with items removed for clarity.

FIG. 8 schematically illustrates the outer coil spring 170 within the sockets 138 of the cover plates 130, 132, with the inner coil spring 172 and other items removed for clarity. The aperture 116 of the disk plate 96 defines an inner length L. Similarly inner surfaces of the sockets 138 and the cover plates 130, 132 define a distance of about length L. When the driven disk 56 is assembled, the springs 170, 172 are confined to an axial length of about the length L. In the embodiment illustrated, the springs 170, 172 have an unstressed length (natural state) of a predetermined amount which is greater than the length L. Accordingly, the springs 170, 172 must be compressed when the driven disk 56 is assembled. The energy of compression for all of the springs 170, 172 provides the preloading for the driven disk 56. As the disk plate 96 rotates about the axis A-A relative the cover plates 130, 132 (and the hub assembly 120), from the assembled state of FIG. 8, the springs 170, 172 are compressed further. Stops (not shown) may be used to limit the axial deflection of the springs 170, 172.

Thus provided, the engine 28 may supply torque to the input shaft 38 of the transmission 22 through the driven disk 56 without significant relative rotation between the disk plate 96 and the hub assembly 120, as the springs 170, 172 restrict this relative rotation. As the amount of supplied torque increases above the preloading of the driven disk 56, the disk plate 96 and the hub assembly 120 will rotate relative one another, with the springs 170, 172 absorbing energy and damping the relative torsional vibrations that may be transmitted through the drive train 20. Generally, the transmission of torque through the driven disk 56 of a magnitude that is below the preloading torque value may be referred to as a "First Stage", and the transmission of torque through the driven disk 56 of a magnitude that is above the preloading torque value, resulting in relative rotation between the disk plate 96 and the hub assembly 120, may be referred to as a "Second Stage".

Figure 9:
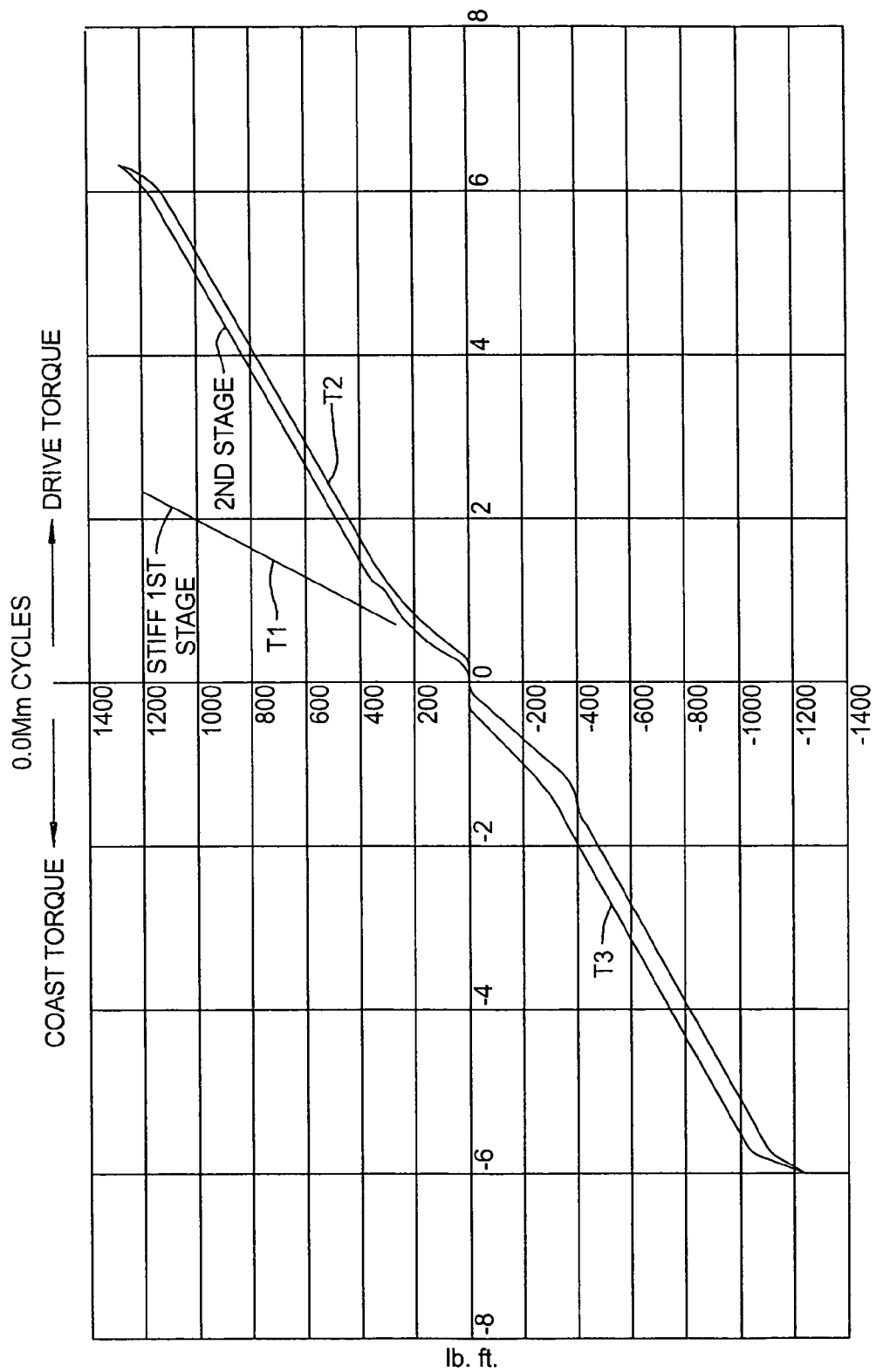
FIG. 9 is a graphical illustration of the relative displacement between a transmission input shaft and a flywheel compared to the torque input from the flywheel.

With reference to FIG. 9, a graphical illustration of the relative rotation of the hub assembly 120 and the disk assembly 112 is compared to the torque transmitted between the hub assembly 120 and the disk assembly 112. In the illustration, the relative rotation is expressed in degrees and the torque is expressed in ft·lb. Curve T1 represents the drive torque transmitted from the flywheel 62 to the transmission input shaft 38 by a preloaded damper, such as the outer coil springs 170 and the inner coil springs 172 prior to the drive torque fully overcoming the preload (First Stage). Curve T2 represents the drive torque transmitted from the flywheel 62 to the transmission input shaft 38 by the preloaded damper after the preload has been fully overcome and the hub assembly 120 rotates relative to the disk assembly 112 (Second Stage). Curve T3 represents the coast torque transmitted from the transmission input shaft 38 to the flywheel 62 by the preloaded damper after the preload has been fully overcome. An additional curve, representing the coast torque transmitted from the transmission input shaft 38 to the flywheel 62 prior to the drive torque fully overcoming the preload, is not illustrated.

Figure 10:
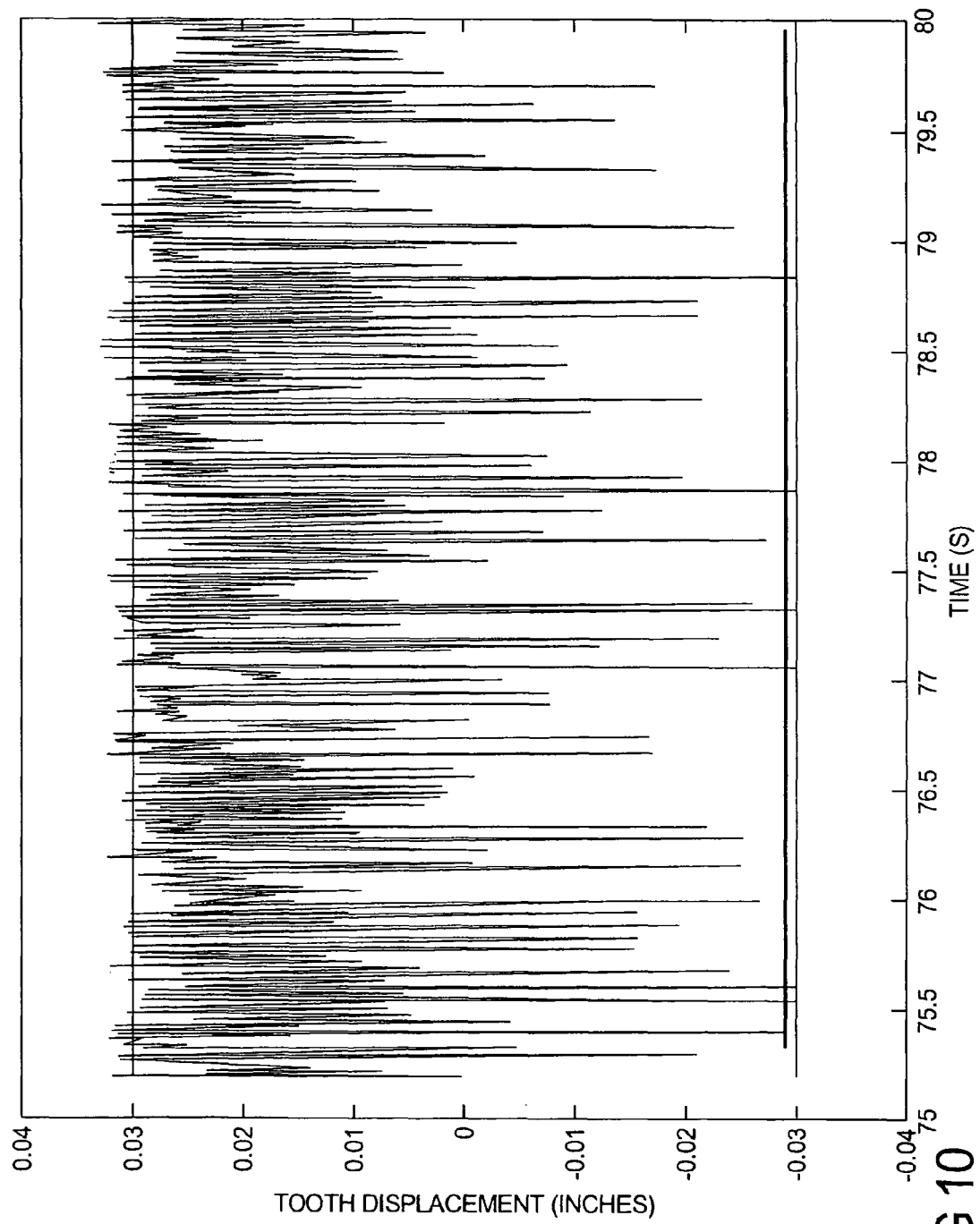
FIG. 10 is a graphical representation of the relative displacement between meshing gears at about the pitch line of the gears during operation for a power train with a selected driven disk assembly.
Figure 11:
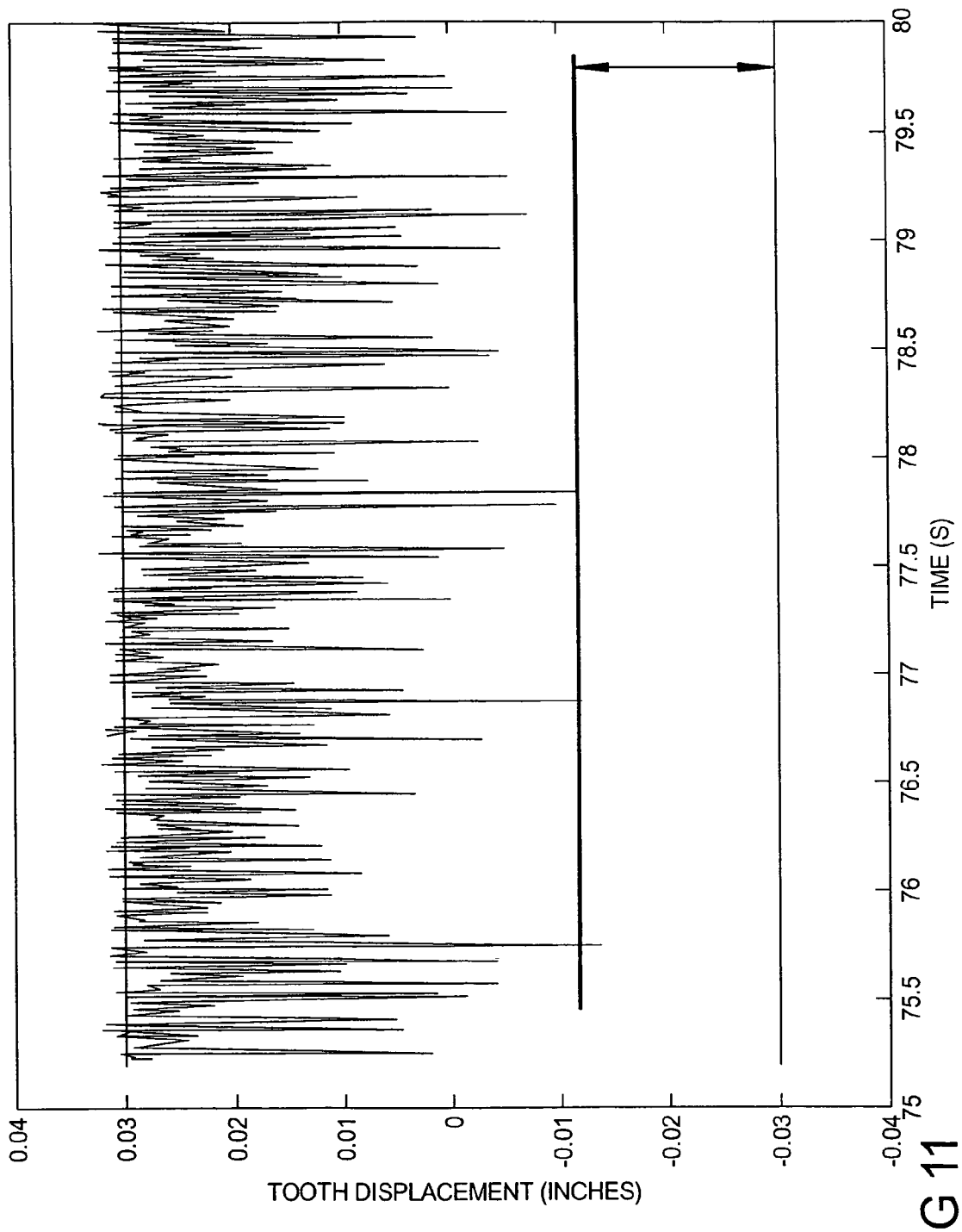
FIG. 11 is a graphical representation of the relative displacement between meshing gears at about the pitch line of the gears during operation for another power train with a selected driven disk assembly.
Figure 12:
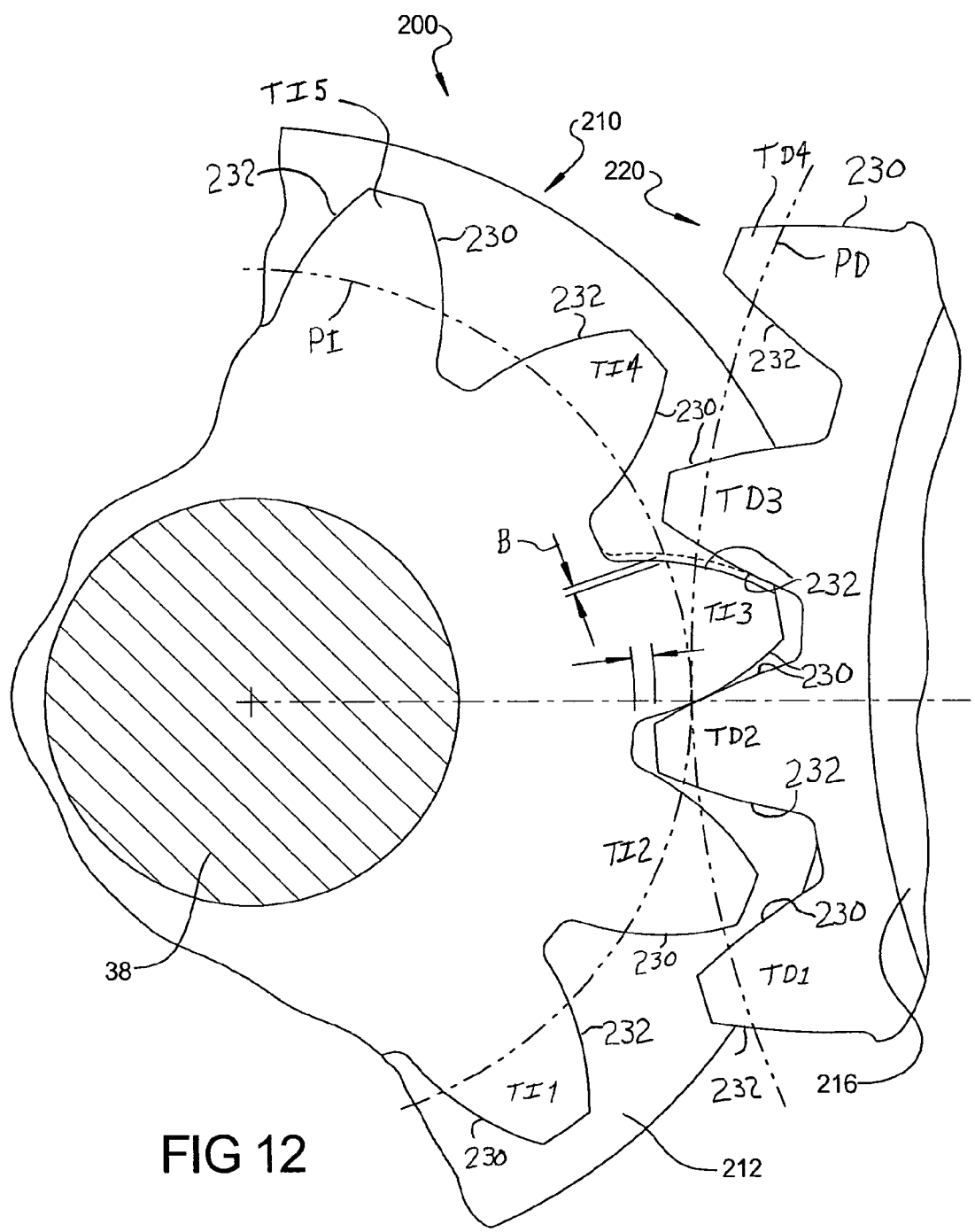
FIG. 12 is a partial sectional view of the interior of a transmission.

FIGS. 10 and 11 are graphical illustrations of the relative displacement between the teeth of meshing gears at about the pitch line of the gears during operation for a power train with a selected driven disk assemblies. With brief reference to FIG. 12, a partial, representative, interior portion 200 of the transmission 22 is shown. The transmission 22, illustrated in limited detail for comparative purposes, is shown to include an input gear 210 coupled supported for rotation relative to the input shaft 38. The input gear 210 may be engaged to the input shaft 38 for rotation therewith by a gear clutch 212. The input shaft 38 is supported by a bearing (not shown) for rotational movement therebetween, and the bearing is supported in the housing (not shown) of the transmission 22. The transmission 22 also includes a bearing 216 supported by the housing and a driven gear 220 supported within the bearing 216 for rotation relative the housing. Collectively, the gears 210, 220 are a pair of meshing gears. When the gear clutch 212 is engaged, torque may be transferred from the engine 28, through the flywheel 62, to the driven disk 56 to the input shaft 38, to the input gear 210, and to the driven gear 220.

The input gear 210 is illustrated to include a plurality of teeth including a first input tooth TI1, a second input tooth TI2, a third input tooth TI3, a fourth input tooth TI4, and a fifth input tooth TI5. The driven gear 220 is illustrated to include a plurality of teeth including a first driven tooth TD1, a second driven tooth TD2, a third driven tooth TD3, a fourth driven tooth TD4. Each tooth has a drive side 230 and a coast side 232, as discussed in greater detail below. The meshing relationship between the gears 210, 220 defines a pitch diameter PI of the input gear 210 and a pitch diameter PD of the driven gear 220. As illustrated with the drive side 230 of the third input tooth TI3 in contact with the drive side 230 of the second driven tooth TD2, a clearance, or backlash B exists between the coast side 232 of the third input tooth T13 and the coast side 232 of the third driven tooth TD3. The backlash B is measured along the pitch diameter PI of the input gear 210.

Generally, backlash is a term describing the amount of clearance between meshing teeth of meshing gears, as illustrated above, although the backlash may be different for each meshing gear in a pair of meshing gears, may differ among teeth within a single gear, and may be measured at other representative locations within the meshing pair of gears. As the input shaft rotates clockwise, as viewed in FIG. 12, torque transferred from the input gear 210 to the driven gear 220 is transmitted through the drive sides 230 of the teeth of gears 210, 220. The inventors have discovered that at certain operating conditions, the rotational speed of the driven gear 220 oscillates when compared to the rotational speed of the input gear 210. This oscillation may involve the drive sides 230 of the meshing teeth to momentarily lose contact, and may also include contact of the coast sides of teeth. When torque is being increased within the meshing pair of gears 210, 220, such as a launch condition, the oscillations may be experienced at low torque levels, such as levels lower than about 30 percent of the maximum torque output of the engine 22.

In the examples shown in FIGS. 10 and 11, the backlash between teeth of the meshing gears, such as the gears 210, 220, taken along a pitch diameter, or pitch line, is a minimum of about 0.06 inches (1.52 mm). That is, with a first meshing gear stationary, the second meshing gear may be rotated such that a meshing tooth, such as the third input tooth TI3, on the second gear will move from contact with a first tooth, such as the second driven tooth TD2, on the first gear to contact with a second tooth, such as the third driven tooth TD3, on the first gear. Thus rotated, the meshing tooth traveled a distance of about 0.06 inches (1.52 mm), measured along the pitch line. When the drive sides of the meshing tooth of the second gear and the first tooth of the first gear are in contact, the tooth displacement, as illustrated in FIGS. 10 and 11, is 0.03 inches (0.76 mm) from either side of a center position. Thus, the Tooth Displacement illustrated in FIGS. 10 and 11 ranges between about 0.03 inches (0.76 mm) and about −0.03 inches (−0.76 mm). While the single graphical line in each of FIGS. 9 and 10 may go beyond the bounds of about 0.03 inches (0.76 mm) and about 0.03 inches (0.76 mm), or may stop short of these bounds, this deviation is taken to be within the measuring equipment and contact between the adjacent teeth of meshing gears is assumed for each instance that the line is illustrated to extend outside the range of 0.022 (0.56 mm) to −0.022 inches (−0.56 mm).

The simulated operational parameters of FIGS. 10 and 11 included a fully engaged clutch, and an initial input torque of about 10 to about 30 percent of the maximum torque of an exemplary prime mover.

For the graphical illustrations of the power trains of FIGS. 10 and 11, similar equipment and similarly simulated parameters and characteristics were used, with the exception of preloading within damper springs of the respective disk assemblies. In the illustrated example of FIG. 10, no preloading, or a zero clearance, was provided for the damper springs. In the illustrated example of FIG. 10, a preloading, or a negative clearance of about 0.03 inches (0.76 mm), was provided for the damper springs. The preloading was about 200 ft·lb (271 N·m), which was greater than 20% of the maximum torque of a prime mover for providing torque to the disk assembly represented by the illustration of FIG. 11. Preferably, the preload will be about 30% of the maximum torque of a prime mover to provide a sufficiently stiff first stage while allowing for damping at higher torque values.

As best illustrated in FIG. 10, the tooth displacement reached the range of about −0.022 inches (−0.56 mm) to about −0.03 inches (−0.76 mm) on several occurrences, representing double impacts between the teeth of the meshing gears (impacts on the 'coast side' of the teeth that then result in a subsequent impact on the drive side of the teeth of the meshing gears 210, 220). In the illustrative example of FIG. 11, the tooth displacement did not extend beyond −0.022 inches, representing no double impacts between the meshing teeth.

As illustrated by comparing the relative tooth displacement of FIGS. 10 and 11, the disk assembly of FIG. 10 permits greater circumferential displacement between the meshing gears during torque transmission therebetween. This greater relative displacement of the meshing teeth, and other parameters, are believed to increase the noise emanating from a drive train, such as the drive train 20, during identifiable operational parameters.

In the embodiment illustrated, the engine 28 has a maximum torque output of about 750 ft·lb (1020 N·m) and a maximum horsepower output of about 250 hp (186 kw). Also in the embodiment illustrated, the energy storage members 140 are installed with a negative clearance of about 0.03 inches (0.76 mm) in order to ensure an adequate preload. That is, the springs 170, 172 when installed, or in an installed condition, are confined to a maximum axial length L (FIG. 8). This length L is about 0.03 inches (0.76 mm) less in axial length than when the springs 170, 172 are in an unstressed (normal) condition. However, depending on other conditions, such as spring modulus and the distance R (FIG. 6), the negative clearance may be any amount of axial displacement from the unstressed condition (zero clearance).

Preferably, the preload is about 150 ft·lb (203 N·m) to about 250 ft·lb (340 N·m) for an engine 28 with a maximum torque output of about 750 ft·lb (1020 N·m). That is, the preload within the driven disk 56 is preferably at least about 20% of the maximum torque of an engine, such as the engine 28, and even more preferably the preload is about 30% of the maximum torque. The distance R that the damper springs 170, 172 are spaced from the axis A-A, and the spring modulus (force necessary to deflect a unit distance) of the damper springs 170, 172, at least in part, determine the rated torque capacity of the damper.

In this manner, the driven disk 56 may act as a rigid disk at lower torque levels, such as levels below the preload and slightly above the preload. Also, the driven disk 56 may absorb greater levels of operational transients, such as the engagement of a centrifugal clutch. Thus provided, the preloading of the energy storage members 140 reduces vibrations within the drivetrain 20, and associated noise and harshness that reaches a user, such as a driver (not shown).

Although the engine 28 in the illustrative example has a maximum torque of about 750 ft·lb (1020 N·m) and a horsepower of about 250 hp (186 kw), other engines of differing power output may be used with the power train as described.

While the clutch 30 is described herein as a centrifugal clutch, one would recognize that the clutch for use with the driven disk 56 may be any type of clutch, including manually or automatically actuated. Furthermore, the advantages and operational characteristics of the clutch 30 presented herein will perform similarly with a manually or automatically actuated clutch. Specifically, a user operating a manual clutch would experience lower magnitudes of vibrations, fewer vibrations, and less noise at operational conditions of concern and may not be required to alter characteristics of the drive train 20 (such as engine speed, or clutch engagement clamping force) to reduce noise, vibrations or harshness.

Although the driven disk 56 is described herein as having preloaded energy storage members 140 for vibration reduction and torque transmission, the driven disk 56 may also include a hysteresis (not shown), such as a frictional member located between the cover plate 130 and the disk plate 96 in order to limit the relative displacement between the hub assembly 120 and the disk assembly 112. An exemplary hysteresis is illustrated in commonly owned U.S. Pat. No. 6,923,305, the disclosure of which is hereby incorporated by reference.

The preceding description has been presented only to illustrate and describe exemplary embodiments of the methods and systems of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. A friction clutch apparatus comprising:
  a disk assembly having:
    a disk portion selectively coupled to a first member;
    a hub portion coupled to a second member and generally axially aligned with said disk portion, wherein said disk portion is rotatable relative to said hub portion, and said disk assembly selectively transmits a torque between said first member and said second member; and
    an energy storage member selectively damping the relative rotation between said disk portion and said hub portion, wherein the damping includes relative rotation between said disk portion and said hub portion, said energy storage member being preloaded, thereby requiring a preselected amount of torque to be applied by one of said disk portion and said hub portion to the other of said disk portion and said hub portion prior to fully overcoming the preload during at least a portion of the relative rotation, said energy storage member damping the relative rotation during a first stage when the transmitted torque is less than the preselected amount of torque, and during a second stage when the transmitted torque is greater than the preselected amount of torque, the energy storage member more stiffly damping the relative rotation during the first stage than the second stage, but wherein there is relative rotation during both the first stage and during the second stage;
  wherein relative rotation between the disk portion and the hub portion necessarily deflects the energy storage member at all times.

2. The apparatus of claim 1, further comprising a centrifugal clutch actuation mechanism.

3. The apparatus of claim 1, further comprising a friction member secured to said disk portion.

4. The apparatus of claim 1, wherein said energy storage member includes a plurality of predamper springs, wherein said predamper springs are compressed in an installed configuration in order to provide the preloading.

5. The apparatus of claim 1, wherein the preselected amount of torque is greater than about 150 ft·lb.

6. The apparatus of claim 1, wherein the preselected amount of torque is between about 150 and about 250 ft·lb.

7. The apparatus of claim 1, wherein the preselected amount of torque is greater than about 20% of a maximum torque transmitted through said disk assembly.

8. The apparatus of claim 1, wherein the energy storage member includes a first spring and a second spring, and at least one of the first spring and the second spring is selectively preloaded.

9. The apparatus of claim 8, wherein both the first spring and the second spring are preloaded when the disk assembly is not transmitting a torque.

10. The apparatus of claim 1, wherein the first stage and the second stage represent a drive torque having a positive relative rotation and a third stage that represents a coast torque having a negative relative rotation, a transition region of torque existing between the drive torque and the coast torque at least generally having neither positive relative rotation nor negative relative rotation.

11. The apparatus of claim 10, wherein the positive relative rotation of the first stage is approximately at least 200 degrees.

12. A torque transfer system comprising:
  a transmission having torque transferring gears, wherein the gears have meshing teeth selectively transmitting a torque therebetween; and
  a centrifugally actuated clutch including a disk assembly having:
    a disk portion selectively coupled to a first member;
    a hub portion coupled to a second member and generally axially aligned with said disk portion, wherein said disk portion is rotatable relative to said hub portion, and said disk assembly selectively transmits a torque between said first member and said second member; and
    an energy storage member selectively damping the relative rotation between said disk portion and said hub portion, wherein the damping includes relative rotation between said disk portion and said hub portion, said energy storage member being preloaded, thereby requiring a preselected amount of torque to be applied by one of said disk portion and said hub portion to the other of said disk portion and said hub portion prior to fully overcoming the preload during at least a portion of the relative rotation, said energy storage member damping the relative rotation during a first stage when the transmitted torque is less than the preselected amount of torque, and during a second stage when the transmitted torque is greater than the preselected amount of torque, the energy storage member more stiffly damping the relative rotation during the first stage than the second stage, but wherein there is relative rotation during both the first stage and during the second stage;

wherein the energy storage member is deflected at all times during relative rotation between the disk portion and the hub portion.

13. The apparatus of claim 12, wherein the preload selectively reduces double impacting of the meshing teeth.

14. The system of claim 12, wherein the preselected amount of torque is greater than about 150 ft·lb.

15. The system of claim 12, further comprising a friction member secured to said disk portion, wherein said friction member is selectively clamped between a pressure plate and a flywheel.

16. The system of claim 12, wherein the preselected amount of torque is greater than about 20% of a maximum torque transmitted through said disk assembly.

17. The system of claim 12, wherein the first stage and the second stage represent a drive torque having a positive relative rotation and a third stage that represents a coast torque having a negative relative rotation, a transition region of torque existing between the drive torque and the coast torque at least generally having neither positive relative rotation nor negative relative rotation.

18. A method of reducing vibrations in a drive train system comprising:

assembling a disk assembly with a disk portion and a hub portion, wherein the disk portion is selectively coupled to a first member of the drive train, and the hub portion is coupled to a second member of the drive train and generally axially aligned with the disk portion, wherein the disk portion is rotatable relative to the hub portion, and the disk assembly selectively transmits a torque between the first member and the second member;

preloading an energy storage member within the disk assembly to provide a preload between the disk portion and the hub portion, wherein the energy storage member selectively dampens the relative rotation between the disk portion and the hub portion, the damping includes relative rotation between the disk portion and the hub portion, the energy storage member is preloaded, thereby requiring a preselected amount of torque to be applied by one of the disk portion and the hub portion to the other of the disk portion and the hub portion prior to fully overcoming the preload during at least a portion of the relative rotation, said energy storage member damping the relative rotation during a first stage when the transmitted torque is less than the preselected amount of torque, and during a second stage when the transmitted torque is greater than the preselected amount of torque, the energy storage member more stiffly damping the relative rotation during the first stage than the second stage, but wherein there is relative rotation during both the first stage and during the second stage; and deflecting the preloaded energy storage member at all times when there is relative rotation between the disk portion and the hub portion.

19. The method of claim 18, further comprising increasing the preload on the disk assembly to about 30% of the maximum torque input to the torque transmitting member.

20. The method of claim 18, further comprising preloading a plurality of energy storage members.

21. The method of claim 18, wherein the first member of the drive train is a flywheel.

22. The method of claim 18, wherein the second member of the drive train is a transmission input shaft.

23. The method of claim 18, the first stage and the second stage represent a drive torque having a positive relative rotation and a third stage that represents a coast torque having a negative relative rotation, a transition region of torque existing between the drive torque and the coast torque at least generally having neither positive relative rotation nor negative relative rotation.

* * * * *

UNITED STATES PATENT AND TRADEMARK OFFICE
CERTIFICATE OF CORRECTION

| | | |
|---|---|---|
| PATENT NO. | : 7,886,887 B2 | Page 1 of 1 |
| APPLICATION NO. | : 11/347042 | |
| DATED | : February 15, 2011 | |
| INVENTOR(S) | : Michael L. Bassett et al. | |

It is certified that error appears in the above-identified patent and that said Letters Patent is hereby corrected as shown below:

ON THE TITLE PAGE:

At item [75] Inventors, change inventor name from

"Clinton J. McClellan" to "Clinton L. McClellan"

Signed and Sealed this
Twenty-sixth Day of April, 2011

David J. Kappos
*Director of the United States Patent and Trademark Office*